B. KELLOGG, DEC'D.
E. F. KELLOGG, ADMINISTRATRIX.
FIRELESS COOKER.
APPLICATION FILED AUG. 17, 1906.
968,165.
Patented Aug. 23, 1910.
3 SHEETS—SHEET 1.
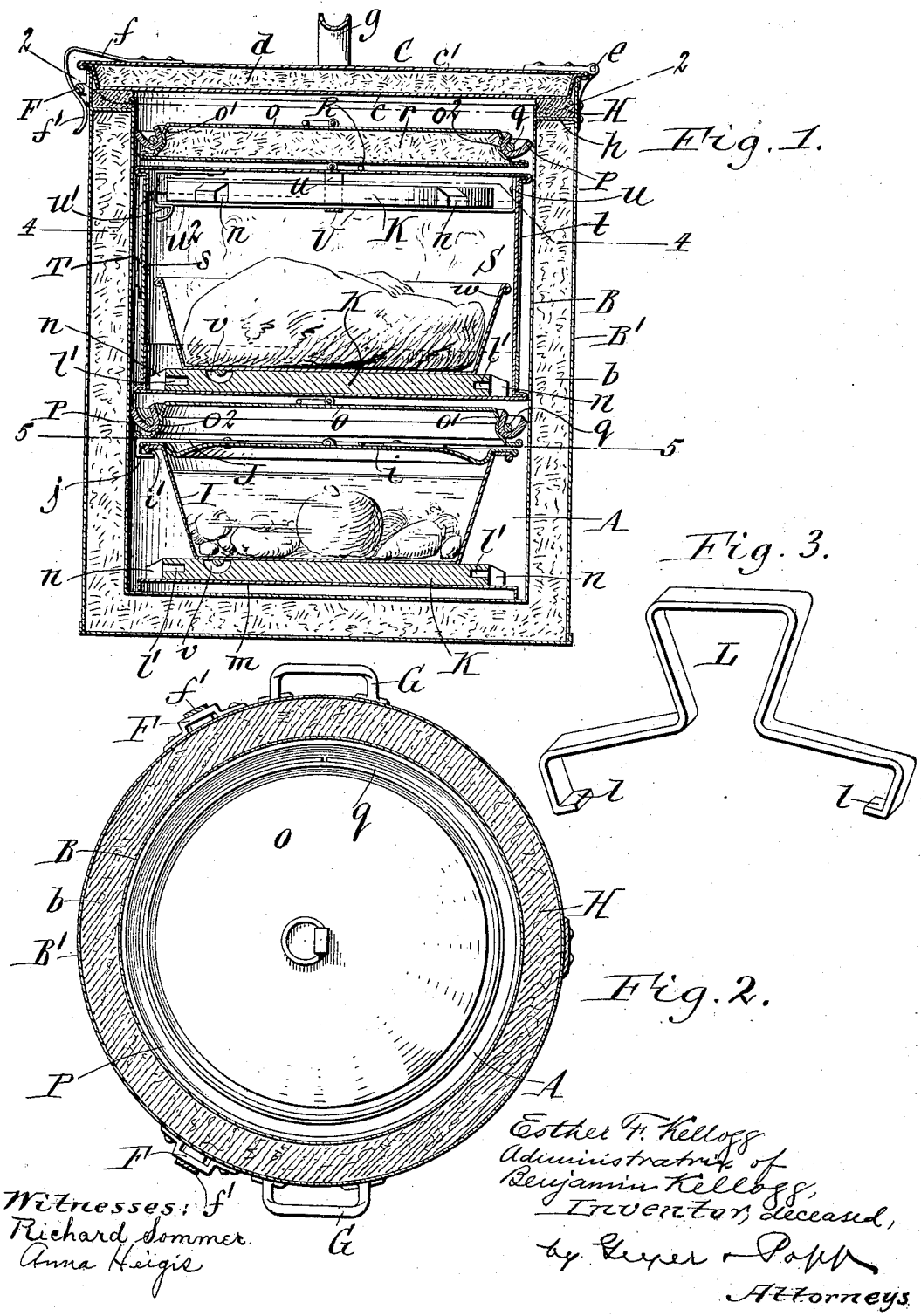

B. KELLOGG, DEC'D.
E. F. KELLOGG, ADMINISTRATRIX.
FIRELESS COOKER.
APPLICATION FILED AUG. 17, 1906.
968,165.
Patented Aug. 23, 1910.
3 SHEETS—SHEET 2.
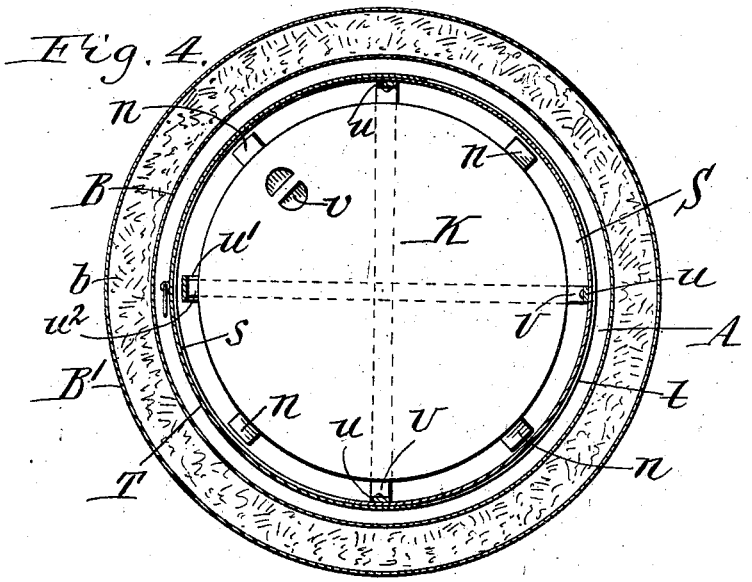
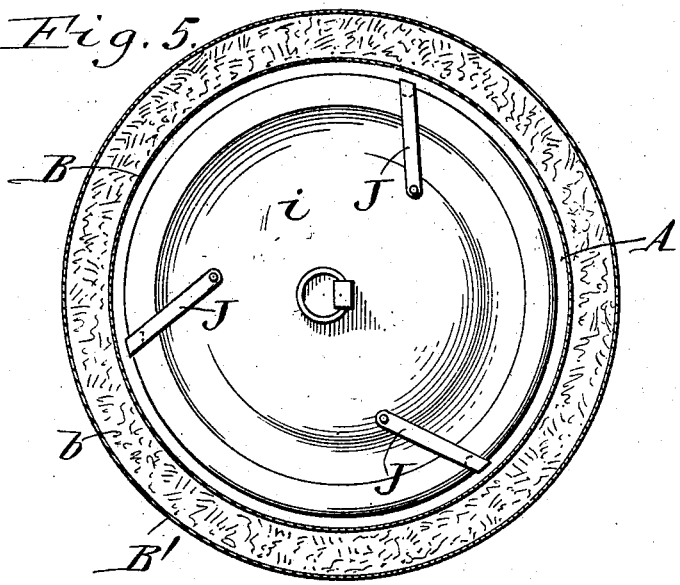

B. KELLOGG, DEC'D.
E. F. KELLOGG, ADMINISTRATRIX.
FIRELESS COOKER.
APPLICATION FILED AUG. 17, 1906.

968,165.

Patented Aug. 23, 1910.

Witnesses:
Richard Sommer.
Anna Heigis

Esther F. Kellogg,
Administratrix
of Benjamin Kellogg,
Inventor, deceased
by Geyer & Popp
Attorneys

UNITED STATES PATENT OFFICE.

ESTHER F. KELLOGG, OF BUFFALO, NEW YORK, ADMINISTRATRIX OF BENJAMIN KELLOGG, DECEASED.

FIRELESS COOKER.

968,165.  Specification of Letters Patent.  Patented Aug. 23, 1910.

Application filed August 17, 1906. Serial No. 331,050.

*To all whom it may concern:*

Be it known that BENJAMIN KELLOGG, deceased, late a citizen of the United States, residing at Buffalo, in the county of Erie and State of New York, did invent certain new and useful Improvements in Fireless Cookers, of which the following is a specification.

This invention relates to that class of cookers in which the cooking of the victuals is completed without fire and which are generally known as "fireless cookers".

The object of this invention is to produce a cooker of this character which is comparatively simple and durable in construction; which permits of cooking different articles without mixing the flavors; which is so constructed that the maximum effect of the heat is utilized for cooking and which permits of maintaining a higher temperature and thus enable articles to be cooked which could not be done with cookers of this character as heretofore constructed.

In the accompanying drawings consisting of 3 sheets: Figure 1 is a vertical section of improved cooker. Fig. 2 is a horizontal section in line 2—2, Fig. 1. Fig. 3 is a perspective view of the holder or lifter for the auxiliary heating plates. Figs. 4 and 5 are horizontal sections in lines 4—4 and 5—5 Fig. 1, respectively. Fig. 6 is a horizontal section showing the form of cooker body preferred for transportation. Fig. 7 is a fragmentary sectional elevation of the upper part of the cooking chamber showing a modification of the means for fastening the lid or cover. Fig. 8 is a top plan view of the same.

Similar letters of reference indicate corresponding parts throughout the several views.

The body or cooking chamber of the fireless cooker may be of any shape best suited to the particular conditions under which the same is to be used. When the cooker is intended for cooking long articles such as poultry, or in the army which shifts its camp, or when used under other conditions requiring the same to be transported frequently it is preferable, to make the main cooking chamber A oblong in horizontal section and round the corners $a$, as shown in Fig. 6. For general use it is more desirable to make the main cooking chamber in the form of an upright cylinder, as shown in Figs. 1, 2, 4 and 5.

The cooking chamber consists generally of an inner wall or shell B, an outer wall or shell $B^1$ separated from the inner shell by an intervening space, and an insulating filling $b$ of asbestos, paper, felt, ashes, shavings or other material which is a non-conductor of heat. The heat insulating or non-conducting jacket thus formed extends around the sides and bottom of the cooking chamber but the upper or front end is left open to form an inlet or passage through which the articles and cooking utensils are introduced into the cooking chamber and removed therefrom. The inlet opening of the cooking chamber is normally closed by a cover C composed of inner and outer walls or plates $c$ $c^1$ and a filling $d$ of felt or the like arranged in the space between said walls so as to jacket the same and resist radiation of the heat from the cooking chamber. This cover may be connected permanently on one side to the top of the body or cooking chamber by a hinge $e$ while its opposite side is detachably connected with the cooker body by one or more fastening devices, two being shown in Fig. 2. Each of these fastenings consists of a projection or abutment F arranged on the outer side of the cooking chamber near the top thereof and a spring catch composed of a horizontal upper part $f$ which is secured at its inner end to the top of the cover and a depending lower part $f^1$ which inclines inwardly from the outer end of the upper part and is adapted to frictionally engage the abutment F.

If desired the fasteners shown in Figs. 7 and 8 may be used for holding the cover of the cooking chamber in place the same consisting of a horizontally swinging arm $F^1$ pivoted to the top of the cover and having a downwardly and inwardly turned hook $f^2$ which is adapted to engage the underside of a rim $f^3$ on the cooking chamber and lock the cover thereon upon swinging the arm into a tangential position but to clear said rim and permit the cover to be lifted upon swinging the arm into a radial position.

For convenience in shifting the cooker and manipulating its cover, handles G g are placed on the outer sides of the body and top of the cover, as shown in Figs. 1 and 2.

In order to produce a practically air tight joint between the body of the cover, a packing ring H of felt or other suitable material is interposed between the upper end of the cooking chamber and the margin of the cover. The packing ring is preferably seated in an annular channel or groove formed partly by the upper or front ends of the outer and inner walls of the cooking chamber and partly by a circular diaphragm h which connects said walls near their upper ends and constitutes the bottom of said channel.

The outer wall or shell of the body is preferably somewhat longer than the inner wall and projects upwardly beyond the latter and the cover is constructed to fit within said outer wall and bear against the upper or outer side of the packing, as shown in Fig. 1.

As usual in cookers of this character the article is first cooked, baked or roasted until fully heated by means of a heater or stove of any suitable kind and then the same is placed in the cooking chamber together with an auxiliary heating agent which stores heat. When thus confined in the air tight cooking chamber the cooking, baking or roasting of the particular article is completed by the heat emitted from the heating agent due to the fact that the non-conducting jacket of the cooking chamber prevents outward radiation of the heat and compels the heat to spend itself on the articles within the chamber. When it is desired to cook vegetables, meats, &c., the same are first placed with water in a dish I and after being thoroughly heated on an ordinary stove are then placed in the cooker, where the cooking is completed by the heat given off from the hot water contained in the dish. In order to avoid loss of heat while transferring the dish I from the stove to the cooker a cover i is applied to the top of the dish. This cover may be detachably secured to the dish by any suitable means, those shown in Figs. 1 and 5 of the drawings consisting of a plurality of catches or fasteners, each of which consists of a horizontally swinging arm J pivoted at its inner end to the top of the dish cover and having a downwardly and inwardly turned hook j at its outer end. In applying the cover to the dish the fasteners are shifted so that their arms are arranged radially in which position the hooks j clear the rim $i^1$ of the dish and permit the cover to be placed thereon. After the cover has been thus placed on the dish the fasteners are turned into a tangential position so that their hooks engage underneath the rim of the dish, as shown in Figs. 1 and 5, thereby holding the cover on the dish and preventing displacement of the same and avoiding loss of heat.

For cooking more rapidly or maintaining a higher temperature for a longer period of time than is possible by the use of hot water, one or more auxiliary heating plates K are employed either alone or in addition to the hot water as a heating agent. These plates are preferably of circular form and constructed of cast iron although other materials may be used. These plates are heated on a stove or otherwise to a temperature much higher than it is possible to heat water and are then placed in the cooking chamber together with the articles to be cooked. Each heating plate is preferably placed in and removed from the cooking chamber by a spring handle L, shown in Fig. 3, having the general shape of a bow and provided at its opposite lower ends with inwardly turned jaws l l which are adapted to enter openings or recesses $l^1$ $l^1$ in the edges of the heating plate. When a heating plate is used the same is preferably supported above the bottom of the cooking chamber by means of an interposed false bottom m, thereby preventing the non-conducting filling of the jacket, if it is felt or similar material, from being scorched. For the same reason the heating plate is provided at its edge with a plurality of laterally projecting guard lugs n which prevent the plate from engaging the inner wall of the cooking chamber to any considerable extent and injuriously affecting the filling.

When it is desired to cook or bake different articles at the same time without permitting the flavors to mingle, the cooking chamber is divided into several separate compartments each of which receives one kind of article. This division of the cooking chamber is effected by means of one or more partitions each of which consists of a disk o, an annular flange $o^1$ connected at its upper edge with the periphery of the disk and provided on its outer side with an annular groove $o^2$, a packing ring P of felt or similar material which is U-shaped in cross section and bears with its outer flange against the inner side of the cooking chamber while its inner flange bears against the flange of said partition, and a split spring ring q which is arranged in the bight of said packing ring P and presses the same into the groove $o^2$. After the first dish is placed in the cooking chamber a partition of the described construction is pushed down into the chamber as far as possible and then the next dish is placed upon the first partition followed by another partition until the desired number of dishes have been put into the cooking chamber. If the number of dishes do not entirely fill the cooking chamber a partition is put into the latter close to the uppermost dish for the purpose of cutting off the uppermost or unused part of the cooking chamber and conserving the heat for use in cooking the articles in the dishes. In pushing the partitions into the cooking chamber the packings of the same fit closely against the inner wall of the chamber and form practically air tight joints between the same, whereby the flavors of the victuals in the separate compartments are kept perfectly distinct and do not affect each other. The uppermost partition preferably has an additional disk R secured to the lower edge of its flange $o^1$ and a filling $r$ of felt or other non-conductor of heat is placed in the space between the same and the plate $o$ for producing an insulating jacket which prevents radiation of heat from the used part to the unused part of the cooking chamber.

When an extraordinary amount of heat is required such as for baking bread, it is preferable to place the article to be baked, together with one or more heating plates K, K in an auxiliary oven S which is in turn placed in the cooking chamber. The side wall of this oven is preferably cylindrical in form and provided with an opening $s$ which may be covered or uncovered by a cylindrical shutter T movable circumferentially on the exterior of the oven and having an opening $t$ which may be placed in or out of register with the side opening in the oven. When two heating plates are employed in the oven one of them is placed on the bottom of the oven while the other is supported underneath the top of the same. The means for thus supporting the upper heating plate in the oven may be variously constructed that shown in the drawings being suitable for the purpose and consisting of two horizontal supporting bars U crossing each other at right angles and connected at their ends with the oven by means of hangers $u$ $u^1$. The side and rear hangers $u$ permanently connect the respective ends of the supporting bar with the oven but the front hanger $u^1$ is constructed in the form of a spring hook which detachably engages with the underside of the front end $u^2$ of the adjacent supporting bar. Upon disengaging the front hanger from the free end $u^2$ of the adjacent supporting bar the latter may be depressed, forming a passage way which permits the upper heating plate to be slid over the supporting bar. Thereafter the front hanger $u^1$ is reëngaged with the end $u^2$ of the adjacent supporting bar to confine the upper heating plate against displacement on the supporting bars. As shown in Fig. 1, such an oven having a baking pan $w$ resting on its lower heating plate is arranged in the upper compartment of the cooking chamber but if desired the same may be located in the lowermost compartment or between two compartments in which other things are being cooked.

For convenience in handling the heating plates when the same are placed in or removed from the oven each of the same is provided in its flat side with a socket $v$ similar to that of a stove lid for the reception of a lifter.

What is claimed as the invention of the said BENJAMIN KELLOGG, is:—

1. A fireless cooker comprising a cooking chamber having an inlet opening at its front end and composed of an inner shell, an outer shell separated from the inner shell by an intervening space and projecting at its front end beyond the front end of the inner shell, a diaphragm connecting the inner and outer shells below their upper ends and forming an annular channel and an insulating filling arranged in said space, a packing ring of felt arranged in said channel, and a cover having an insulating jacket and constructed to fit within the front end of the outer shell and bear against said packing, substantially as set forth.

2. A fireless cooker having a cooking chamber, a dish adapted to be placed in the said chamber and having a rim, a cover for said dish, and a fastener having a horizontally swinging arm pivoted at its inner end to the top of said cover and at one side of the center of the latter and provided at its outer end with a downwardly and inwardly turned hook which is adapted to engage underneath the rim of said dish, substantially as set forth.

3. A fireless cooker comprising a cooking chamber, a false bottom arranged in said chamber, and a heating plate arranged on said false bottom, and having a plurality of laterally projecting guard lugs on its edge, substantially as set forth.

4. A fireless cooker comprising a cooking chamber, a cover for the chamber, and a removable partition for dividing the interior of the chamber into a plurality of compartments comprising a disk having a channel at its edge, a packing arranged in said channel and engaging the inner side of the chamber, and a clamping ring surrounding the outer side of the packing ring.

5. A fireless cooker comprising a cooking chamber, and a partition movable in said chamber and consisting of a disk, an annular flange connected at one edge with said disk and having an annular groove, a packing ring which is U-shaped in cross sections and bears with one flange against the inner wall of said chamber while its other flange bears against the flange of said disk, and a split spring ring engaging with the bight of said packing ring and holding the same in said groove, substantially as set forth.

6. A fireless cooker comprising a cooking chamber, and a partition movable in said chamber and consisting of a disk, an annular flange connected at one edge with said disk and having an annular groove, a packing ring which is U-shaped in cross section and bears with one flange against the inner wall of said chamber while its other flange bears against the flange of said disk, a split spring ring engaging with the bight of said packing ring and holding the same in said groove, another disk connected with the other edge of the grooved flange, and a filling of non-heat conducting material arranged between said disks, substantially as set forth.

7. A fireless cooker comprising a main cooking chamber, an auxiliary oven arranged in the main chamber, a heating plate arranged in the upper part of said oven, and a support for said plate consisting of crossed horizontal bars, hangers permanently connecting the side and rear ends of said bars with the oven, and a hanger secured to the oven and having a hook engaging under the end of the adjacent bar for detachably connecting the same with the oven, substantially as set forth.

Witness my hand this 10th day of August, 1906.

ESTHER F. KELLOGG,
*Administratrix of the estate of Benjamin Kellogg, deceased.*

Witnesses:
WILLIAM S. KELLOGG,
BETH C. MORITZ.